United States Patent
Belfy et al.

(10) Patent No.: US 12,541,576 B2
(45) Date of Patent: Feb. 3, 2026

(54) METHOD FOR DIGITALLY WATERMARK A NEURAL NETWORK, DEVICE AND CORRESPONDING COMPUTER PROGRAM

(71) Applicant: THALES, Meudon (FR)

(72) Inventors: Henri Belfy, Toulouse (FR); Tom Fougere, Toulouse (FR)

(73) Assignee: THALES, Meudon (FR)

( * ) Notice: Subject to any disclaimer, the term of this patent is extended or adjusted under 35 U.S.C. 154(b) by 82 days.

(21) Appl. No.: 18/613,101

(22) Filed: Mar. 22, 2024

(65) Prior Publication Data

US 2024/0330416 A1 Oct. 3, 2024

(30) Foreign Application Priority Data

Mar. 29, 2023 (FR) ...................................... 2303040

(51) Int. Cl.
*G06F 21/16* (2013.01)

(52) U.S. Cl.
CPC .................................... *G06F 21/16* (2013.01)

(58) Field of Classification Search
CPC ... G06F 21/16; H04L 9/3226; H04L 2209/16; H04L 2209/608; G10L 19/018; G06N 3/084
See application file for complete search history.

(56) References Cited

U.S. PATENT DOCUMENTS

| | | | |
|---|---|---|---|
| 8,892,893 B2 | 11/2014 | Horne et al. | |
| 10,223,780 B2 * | 3/2019 | Tan | G06T 7/0002 |
| 10,915,809 B2 * | 2/2021 | Krishnamoorthy | G06T 1/005 |
| 11,163,860 B2 * | 11/2021 | Gu | G06N 3/084 |
| 11,170,793 B2 * | 11/2021 | Jin | G06N 3/045 |
| 11,521,043 B2 * | 12/2022 | Uchida | G06T 1/0021 |
| 11,575,500 B2 * | 2/2023 | Gomez | H04L 9/0825 |
| 11,704,765 B2 * | 7/2023 | Kamath | G06F 16/1858 382/100 |
| 11,972,408 B2 * | 4/2024 | Rouhani | G06Q 20/1235 |
| 12,014,408 B2 * | 6/2024 | Davis | G06N 7/01 |

(Continued)

FOREIGN PATENT DOCUMENTS

WO 2023041212 A1 3/2023

OTHER PUBLICATIONS

Yue Li et al: "A survey of deep neural network watermarking techniques", arxiv.org, Cornell University Library, 201 Olin Library Cornell University Ithaca, NY 14853, Mar. 16, 2021 (Mar. 16, 2021).

(Continued)

*Primary Examiner* — Hosuk Song
(74) *Attorney, Agent, or Firm* — Soquel Group LLC

(57) ABSTRACT

A method of digitally watermarking a neural network, implemented by an electronic device, the neural network being stored within a data structure including blocks of parameters. The method includes, for a current parameter block consisting of at least N parameters representing real numbers, obtaining a message including N bits, at least N iterations of a parameter modification operation within the current block, including obtaining a current parameter, from among the at least N parameters of the current parameter block, and updating the value of a predetermined index bit of the current parameter as a function of a bit in the message.

10 Claims, 4 Drawing Sheets

(56) References Cited

U.S. PATENT DOCUMENTS 12,260,531 B2 * 3/2025 Roulet .................. G06N 3/086
12,339,937 B1 * 6/2025 Wang ...................... G06N 3/08

OTHER PUBLICATIONS

Reda Bellafqira et al: "DICTION: DynamIC robusT white box watermarking scheme", arxiv.org, Cornell University Library, 201 Olin Library Cornell University Ithaca, NY 14853, Oct. 27, 2022 (Oct. 27, 2022).
"Securing Artificial Intelligence (SAI); Traceability of AI Models", ETSI Draft Specification; SAI 010, European Telecommunications Standards Institute (ETSI), 650, Route Des Lucioles ; F-06921 Sophia-Antipolis ; France, No. V0.0.8 Mar. 15, 2023 (Mar. 15, 2023), pp. 1-33.
Mingfu Xue et al: "DNN Intellectual Property Protection: Taxonomy, Methods, Attack Resistance, and Evaluations", arxiv.org, Cornell University Library, 201 Olin Library Cornell University Ithaca, NY 14853, Nov. 27, 2020 (Nov. 27, 2020).
FR 2303040, INPI Rapport de Recherche Preliminaire, Dec. 13, 2023, 3 pages.

\* cited by examiner

METHOD FOR DIGITALLY WATERMARK A NEURAL NETWORK, DEVICE AND CORRESPONDING COMPUTER PROGRAM

CROSS-REFERENCE TO RELATED APPLICATIONS

This application is a U.S. non-provisional application claiming the benefit of French Application No. 23 03040, filed on Mar. 29, 2023, which is incorporated herein by reference in its entirety.

TECHNICAL FIELD OF THE INVENTION

This invention relates to the field of neural network protection. More specifically, the invention relates to the protection of the resulting training data, called parameters, which are used for the inference of a neural network.

BACKGROUND OF THE INVENTION

Neural networks are increasingly deployed and marketed in a wide variety of real-world scenarios because of the performance they achieve, particularly in classification or prediction tasks. Training a deep neural network is a very expensive process that requires (i) the availability of massive amounts of data, often proprietary, capturing different scenarios within a target application; (ii) significant computing resources; (iii) the assistance of deep learning experts to carefully adjust the topology of the network (e.g., the type and number of hidden layers), and to correctly define the training hyper-parameters, such as learning rate, batch size, etc. Consequently, high-performance neural networks require significant investment and must be protected accordingly. This is particularly important when the neural network is implemented within embedded devices; these may be used to recover the neural network and use it in other contexts or other devices.

Digital watermarking techniques are known to protect neural networks. With these techniques, a trained neural network, which takes the form of a data structure containing a set of parameters, is marked (watermarked). A read process is then used to discover the watermark(s) inserted within the data structure. There are two main types of technique for watermarking neural networks: so-called "black box" techniques and so-called "white box" techniques.

White-box techniques essentially involve inserting one or more digital watermarks into the network itself, i.e., into the internal parameters that make it up; e.g., after learning. The internal parameters that are watermarked may correspond directly to model weights, biases, or to the activation of neurons in correspondence with specific inputs. In the case of white-box watermarking, the watermarking decoder extracts the digital watermark(s) from the neural network parameters. This may involve extracting a message inserted in the network or detecting a watermark.

Black-box techniques essentially involve inserting one or more digital watermarks, which are revealed when the neural network is asked a specific question. This insertion may be done during training of the network. So, to identify the presence of a digital watermark, in a black box, only the final output of the neural network is readable. In other words, the watermark is retrieved by querying the model, with a particular query, based on a set of correctly chosen inputs, for example, images or pre-defined text, and by checking the output of the neural network. Throughout the decoding or detection process, the architecture and internal parameters of the neural network are blind to the decoder or detector. In other words, the only elements that may be controlled are the inputs used to query the network and the outputs corresponding to the queries correlated to the requests.

Both types of technique (white box and black box) may be used for the same neural network.

However, these techniques suffer from problems of watermark erasure, particularly when the neural network is modified; e.g., by relearning, pruning, quantization, etc. This is because white-box techniques in particular, which modify the internal parameters of the neural network, are sensitive to modifications made to these parameters (changing the format of the neural network, changing the operator, deleting a layer, changing the input layers, changing the output classes, etc.) by attackers wishing to illegally appropriate the network. This lack of robustness is particularly noticeable for neural networks running on embedded devices.

SUMMARY OF THE INVENTION

One objective of the invention is to propose a white-box neural network digital watermarking technique that solves the problems posed by previous techniques, in particular the problem of robustness. Another objective is to maintain the functional qualities of the neural network (accuracy, false positive, r2, etc.).

To this end, the invention relates to a method of digitally watermarking a neural network, which method is implemented by an electronic device, the neural network being stored within a data structure including blocks of parameters. Such a method includes, for a current parameter block consisting of at least N parameters representing real numbers:

obtaining a message comprising N bits;
at least N iterations of a parameter modification step within the current block, including:
obtaining a current parameter, from among the at least N parameters of the current parameter block; and
updating the value of a predetermined index bit of the current parameter as a function of a bit in the message.

The proposed method makes it possible to steganograph the message to be tattooed. This steganography is simple and effective, since each parameter undergoes a minimal transformation according to a corresponding bit in the message. This modification therefore has little impact on subsequent performance of the neural network. In addition, this steganography is quick to implement and does not require energy-intensive calculations, unlike methods used for learning neural network parameters, as in the prior art. In this way, the claimed method makes it possible to identify the origin of a neural network, for example, when it is used in unauthorized devices or during cyber-attack analysis operations.

According to a particular characteristic, the operation of updating the value of a predetermined index bit of the current parameter as a function of a bit of the message includes calculating an operation or exclusively between a bit of a random vector of size N and the corresponding bit of the message.

In this way, the predetermined index origin bit is cleared in favor of a bit resulting from the operation or exclusively between the message and a random vector of the same size as the message in the form of an encrypted code word.

According to a particular feature, the operation of obtaining the message includes:

obtaining a reference character string;

calculating a cyclic redundancy check code as a function of the reference character string, the cyclic check code being concatenated with the reference character string to form a code word; and a code word encryption delivering an encrypted code word.

According to a particular characteristic, the operation of obtaining the message also includes at least one iteration of an operation of copying the encrypted code word within a character string to obtain the N bit length message.

A basic message redundancy is defined as a function of the block size. The size of the message in bits is a multiple of the size of a unit message. This creates vertical redundancy in the tattoo.

According to a particular feature, the operation of obtaining the message includes:

random selection, within the current block, of a predetermined number K of most significant bits within a predetermined number of parameters of the current block delivering a characteristic binary image;

combining the characteristic binary image with a reference image, delivering a merged image; and further combining the merged image with a binary image randomly obtained on the basis of a random draw of K bits, this further combining operation delivering the message.

The watermarking process takes into account the content of the current block and inserts a reference image to be watermarked. This makes it much easier to visually check the presence of the digital watermark inserted in the current block. This increases the probative value of the tattoo.

According to a particular feature, the combination operations each exclusively implement an operation.

According to another aspect, the invention also relates to an electronic device for digitally watermarking a neural network, the neural network being stored within a data structure including blocks of parameters. Such a device includes, for a current parameter block consisting of at least N parameters representing real numbers:

means for obtaining a message including N bits;

means for implementing at least N parameter modification iterations within the current block, including:

obtaining a current parameter, from among the at least N parameters of the current parameter block; and updating the value of a predetermined index bit of the current parameter as a function of a bit in the message.

According to a preferred implementation, the various operations of the methods disclosed herein are implemented by one or more software programs or computer programs, including software instructions intended to be executed by a data processor of a relay module according to the disclosure and being designed to control the execution of the various operations of the methods. Accordingly, the disclosure also relates to a program, capable of being executed by a computer or by a data processor, the program including instructions for controlling the execution of the operations of the methods as herein mentioned, when executed by a terminal and/or by an integrated circuit. This program may use any programming language, and be in the form of source code, object code, or intermediate code between source code and object code, such as in a partially compiled form, or in any other desirable form. The disclosure also relates to an information medium that may be read by a data processor and includes instructions for a program as mentioned above. The data carrier may be any entity or device capable of storing the program. For example, the medium may include a storage means, such as a ROM, e.g., a CD ROM or a microelectronic circuit ROM, or a magnetic recording means, e.g., a hard disk, flash memory, or another type of storage memory. On the other hand, the information medium may be a transmissible medium such as an electrical or optical signal, which may be conveyed via an electrical or optical cable, by radio or by other means. In particular, the program according to the disclosure may be downloaded from an Internet-type network. Alternatively, the information carrier may be an integrated circuit in which the program is incorporated, the circuit being adapted to execute or to be used in the execution of the process in question. In one embodiment, the disclosure is implemented using software and/or hardware components. With this in mind, the term "module" may be used in this disclosure to refer to a software component, a hardware component, or a combination of hardware and software components. A software component corresponds to one or more computer programs, one or more sub-programs of a program, or more generally to any element of a program or software capable of implementing a function or set of functions, as described below for the module concerned. Such a software component is executed by a data processor of a physical entity (terminal, server, gateway, router, etc.) and is able to access the hardware resources of this physical entity (memories, recording media, communication buses, electronic input/output cards, user interfaces, etc.). Similarly, a hardware component is any element of a hardware assembly capable of implementing a function or set of functions, as described hereinbelow for the module concerned. It may be a programmable hardware component or one with an integrated processor for executing software, for example an integrated circuit, a smart card, a memory card, an electronic card for executing firmware, etc. Each component of the assembly described above naturally implements its own software modules. The various embodiments and features mentioned may be combined with one another to implement the disclosure.

BRIEF DESCRIPTION OF THE DRAWINGS

Further features and advantages of the invention will become apparent from the detailed description given below, by way of indication and not in any way limiting, with reference to the appended figures, in which.

DETAILED DESCRIPTION

Reminders of the Principle

As explained above, one object of the invention is to provide a white-box digital watermarking technique that offers increased resistance to attacks that a neural network may undergo, particularly in an embedded implementation context. Another object of the present invention is thus to make it possible to identify more effectively a neural network that has been extracted from an embedded device, then modified and reinserted into another embedded device, by an attacker who wishes to divert the use of a neural network that does not belong to him, to modify a neural network in order to falsify its results (for example, in order to carry out a cyber attack), or to save money by appropriating the research and development work carried out by a competitor.

The general principle of the invention consists of the insertion, within at least one parameter block of the neural network (previously trained), of a watermark (taking the form of a message) in selected bits of the parameters (numerical values) stored in the parameter block. The invention thus relates to a method of digitally watermarking a (previously trained) neural network including a set of parameter blocks, the parameter blocks including parameters of the neural network. These parameters are, for example, parameters that have been the subject of training, such as layer weights, biases, tensor values, normalization values, convolution values, etc. Thus, at least some of the parameter blocks each include a set of parameters, the number of which varies according to the block in question. In one embodiment, the parameter blocks include real float values of a predetermined number of bits (for example 8, 16, 32 or 64 bits). In other words, each of these real float values is stored, for example, in one, two, four or eight bytes (for a given block, the encoding of the parameters is identical). The invention's digital watermarking process is executed on these parameter blocks to insert, within them, a secret message (the watermarked message) which may be in the form of a repetition of a basic message. For example, the process is implemented on a neural network stored in onnx format, which has the advantage of having numerous APIs for access and modification, regardless of the programming languages used.

Figure 1:
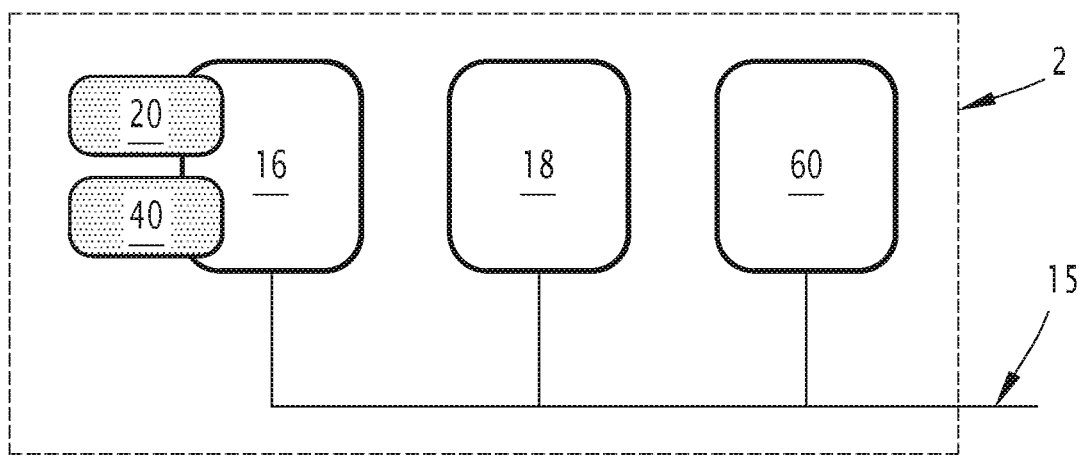
FIG. 1 shows an example of a digital watermarking device, in accordance with an embodiment of the present invention.

FIG. 1 schematically illustrates an electronic digital watermarking device. The electronic digital watermarking device 2 includes a module 20 for obtaining a message to be watermarked Msg, and a module 40 for modifying parameters within the blocks of parameters making up the neural network as shown in FIG. 1.

In the example shown in FIG. 1, digital watermarking device 2 includes an electronic memory unit 16, at least one calculation processor 18, and an interface 60 for communication with remote devices, using a chosen communication protocol, for example a wired protocol and/or a radio communication protocol. The elements of device 2 are adapted to communicate with each other via a data communication bus 15.

In the example shown in FIG. 1, module 20 for obtaining message Msg to be watermarked, and module 40 for modifying parameters within the blocks of parameters making up the neural network, are each produced in the form of software, or a software brick, executable by the processor. The memory of electronic digital watermarking device 2 is then able to store software for obtaining message Msg to be watermarked and software for modifying parameters within the blocks of parameters making up the neural network. The processor is then able to execute each of the software programs for obtaining message Msg to be watermarked and the software program for modifying parameters within the blocks of parameters making up the neural network.

In a variant not shown, the module for obtaining a message to be watermarked and the module for modifying parameters within the parameter blocks constituting the neural network are each produced in the form of a programmable logical component, such as a FPGA (Field-Programmable Gate Array), or as a dedicated integrated circuit, such as an ASIC (Application-Specific Integrated Circuit).

When display device 2 is in the form of one or more software instructions, that is to say in the form of a computer program, also called a computer program product, it is also capable of being stored on a computer-readable medium, not shown. The computer-readable medium is, for example, a medium that may store electronic instructions and be coupled with a bus from a computer system. For example, the readable medium may be an optical disk, a magneto-optical disk, ROM memory, RAM memory, and any type of non-volatile memory (for example, FLASH or NVRAM) or magnetic card. The readable medium in such a case stores a computer program comprising software instructions.

Figure 2:
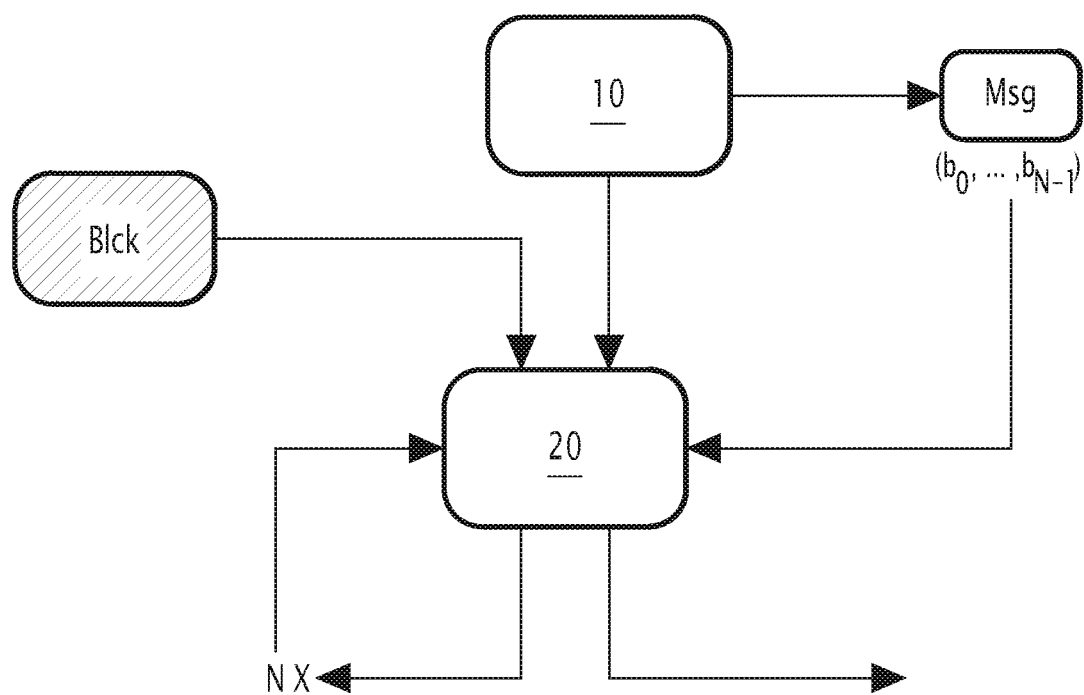
FIG. 2 illustrates a method for digitally watermarking a neural network, in accordance with an embodiment of the present invention.

In relation to FIG. 2, the method of digital watermarking of a neural network of the invention is implemented on a neural network which is stored within a data structure comprising blocks of parameters Blck, the method including, for a current block of parameters (which includes, for example, at least N parameters ($p_0$, ..., $p_{N-1}$) representing real numbers, and include:

an operation 10 for obtaining message Msg including N bits ($b_0$, ..., $b_{N-1}$);

at least N iterations of parameter modification step 20 within the current parameter block, including:

obtaining a current parameter ($p_X$) from the at least N parameters ($p_0$, ..., $p_{N-1}$) of the current parameter block; and updating the value of a predetermined index bit (bipx) of the current parameter (px) according to a bit ($b_0$, ..., $b_{N-1}$) of message Msg.

When the number of parameters stored in the block is greater than the length in bits of the message to be inserted, the update operation is iterated starting from the first bit of the message to be inserted. Alternatively, message Msg to be watermarked already includes several (an integer number greater than two) occurrences of a reference message (base message). The watermarking is carried out in such a way that a whole number of copies of the basic message is watermarked. There is no partial watermarking of the basic message. This results in redundancy in the insertion of the message (in the watermarking) within the neural network, as is explained in detail hereinbelow.

The message to be embedded in the parameter bits (real values) may take several forms. In a first example, the message may take the form of an encrypted character string (or the repetition of an encrypted character string). In a second example, the message to be tattooed may be in the form of an image. In a third example, the message to be tattooed may take the form of a signature.

In the first example, the character string may be constructed as follows: a reference character string is determined (for example, a string defining a copyright, of type "TheCompany1©"). This string may have a specific length (e.g., six, twelve, eighteen or twenty-four characters). An error detection code or cyclical redundancy check (CRC) is calculated from this reference character string. This error detection code is concatenated with the reference character string to form a codeword. This code word also has a predetermined size. The code word is then encrypted (for example, using a stream encryption algorithm in which the size of the encrypted message is identical to the size of the original message, which makes it easier to insert or retrieve messages). The encrypted code word is then encoded, for example, by a reversible pseudo-random transformation, and the encrypted and encoded code word constitutes the message to be inserted within the parameter blocks of the neural network. The encrypted and encoded codeword is also of a predetermined size (for example, sixty-four, one hundred and twenty-eight, or two hundred and fifty-six bits). The size of the encrypted code word is chosen, initially, as a function of the circumstances of the case and in particular as a function of the size of the blocks (for example, as a function of the number of parameters contained in the parameter blocks), so as in particular to allow the complete insertion of at least one occurrence of the message in the blocks of real values, and thus to obtain at least one complete entry of the message in a block.

In the second example, the image to be inserted as a message may be selected so as to visually reproduce a mark of belonging to an entity (for example, the image may be a company logo). The image is selected so that its bit size is compatible with at least some of the parameter blocks (i.e., it may be inserted within a parameter block). As in the case of the character string, it is also possible to calculate an error-correcting code and/or to encrypt (the resulting code word or directly the image) and/or to transform the image, the code word or the encrypted code word as in the first example.

In the third example, the signature may be inserted on the basis of the content of the network itself. This third option is described in more detail hereinbelow.

First Example of a Project

Figure 3:
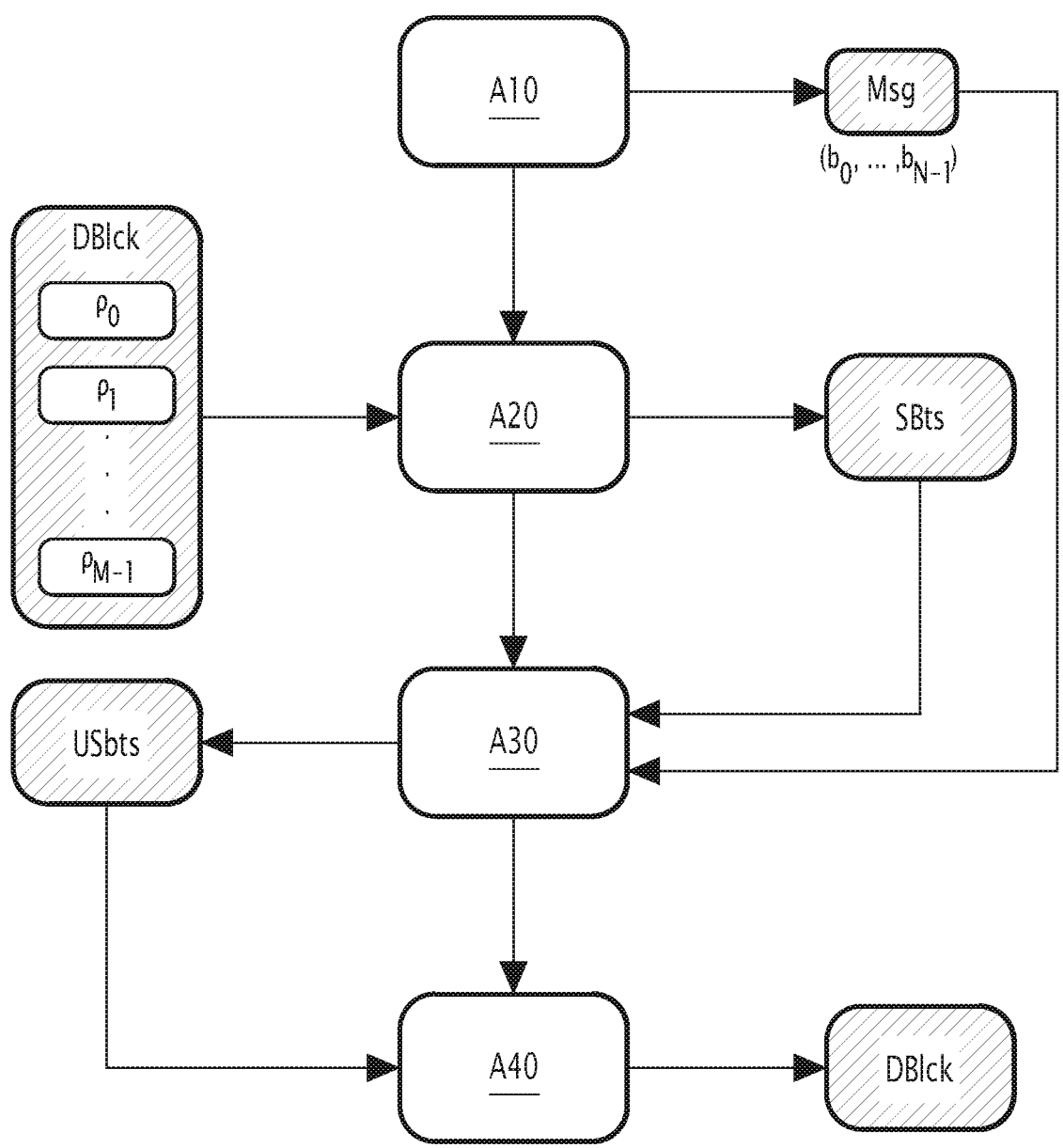
FIG. 3 illustrates a first example of the digital watermarking of a neural network, in accordance with an embodiment of the present invention.

Referring to FIG. 3, this first example shows how the message is watermarked within a current parameter block of the neural network, comprising M different parameters, stored in the form of real numbers.

This method includes:
an operation A10 for obtaining message Msg in the form of a sequence of bits of predetermined length N;
a selection operation A20, within the current parameter block DBlck, of a set of N bits SBts, each bit of set SBts belonging to a different parameter of the current parameter block DBlck;
an operation A30 of modifying each bit of set SBts using a corresponding bit of message Msg, delivering a set of modified bits USbts; and
an operation A40 of rewriting each modified bit of set USbts to its original location within the current DBlck parameter block.

In other words, and more concisely, the proposed method consists of writing the message of predetermined length vertically in the selected bits (for example, in one or more columns of low-order bits).

This means that the digital watermark inserted in the parameter block is invisible. Indeed, insofar as the modification of the original bits is carried out by performing a specific operation on these original bits using the corresponding bits of the message to be watermarked, an attacker cannot determine the presence of the watermark, unless he knows the message that has been inserted and performs the decoding operation enabling the original bits to be identified, before inserting the watermark.

The procedure described may be implemented iteratively on all or some of the neural network's parameter blocks. Preferably, this procedure is implemented in a majority of the neural network's parameter blocks. Digital tattooing is therefore redundant. Even more preferably, this procedure is used for all the parameter blocks in which watermarking is possible or desirable. This makes the tattoo even more resistant to attack.

According to this method, the operation of modifying the bits of the set of bits includes an exclusive or (xor) operation between a set of N randomly obtained bits and each corresponding bit of message Msg. This set of N bits is randomly obtained from a reference seed which is kept for decoding the watermarking. This operation performed or exclusively carried out on message Msg makes it noisy, in a random manner, and prevents an attacker from guessing the presence of the digital watermark within the block parameters. This noise operation may be carried out using other means or other operations. For example, the bits of the network may be used directly instead of generating a random number of bits, or another operation may be carried out or exclusively used.

As mentioned hereinabove, for a current block, the message may be watermarked several times, for example in different bit columns.

The decoding method used is as follows. For a current block of parameters in a neural network which is suspected of belonging to a right holder, the N bits are extracted. These have supposedly been watermarked during a procedure identical or similar to the one described above (the bits which are located at a given index of the parameters of the current parameter block). For example, using the reference seed used during encoding, the set of N bits randomly obtained during encoding is obtained again. Using this set of N bits and the N bits of the current block, an operation is performed or exclusively carried out, which delivers a set of N "denoised" bits, if this operation was performed during encoding. The set of N denoised bits includes at least one repetition of a basic message that has been encoded, all of which are potentially altered by modifications made after the neural network was stolen from the rights holder. For a block, the number of repetitions varies according to the size of the block and the size of the base message. An error-correcting operation may be performed on these denoised bits; for example, majority logic decoding is performed-a repetition code decoding method based on the assumption that the greatest number of occurrences of a symbol is the symbol transmitted. The code word is then checked to determine whether there are one or more repetitions of this encrypted code word: the reverse operation is performed; i.e., decrypting the code word and checking the CRC against the initial secret message.

The presence of a single correct code word, which therefore includes the secret message and the CRC code that corresponds to this message, is sufficient to determine that the current block is part of a neural network belonging to the right holder.

Second Example

In a second example, the marking method is substantially identical to that used in the first example. It consists of watermarking, in a current block, bits, for example low-order bits, of parameters including real values (for example coded on sixteen, thirty-two or sixty-four bits), contained in this block. The principle of watermarking columns of bits has also been retained. However, the nature of the tattoo is made different by the use of a signature instead of the coded message as described above. This signature is obtained from the most significant bits of the current parameter block of the neural network. The principle used is to tattoo a visual signature so that it is easy to see the presence of the digital tattoo. This tattoo is visible with or without any error correction.

Figure 4:
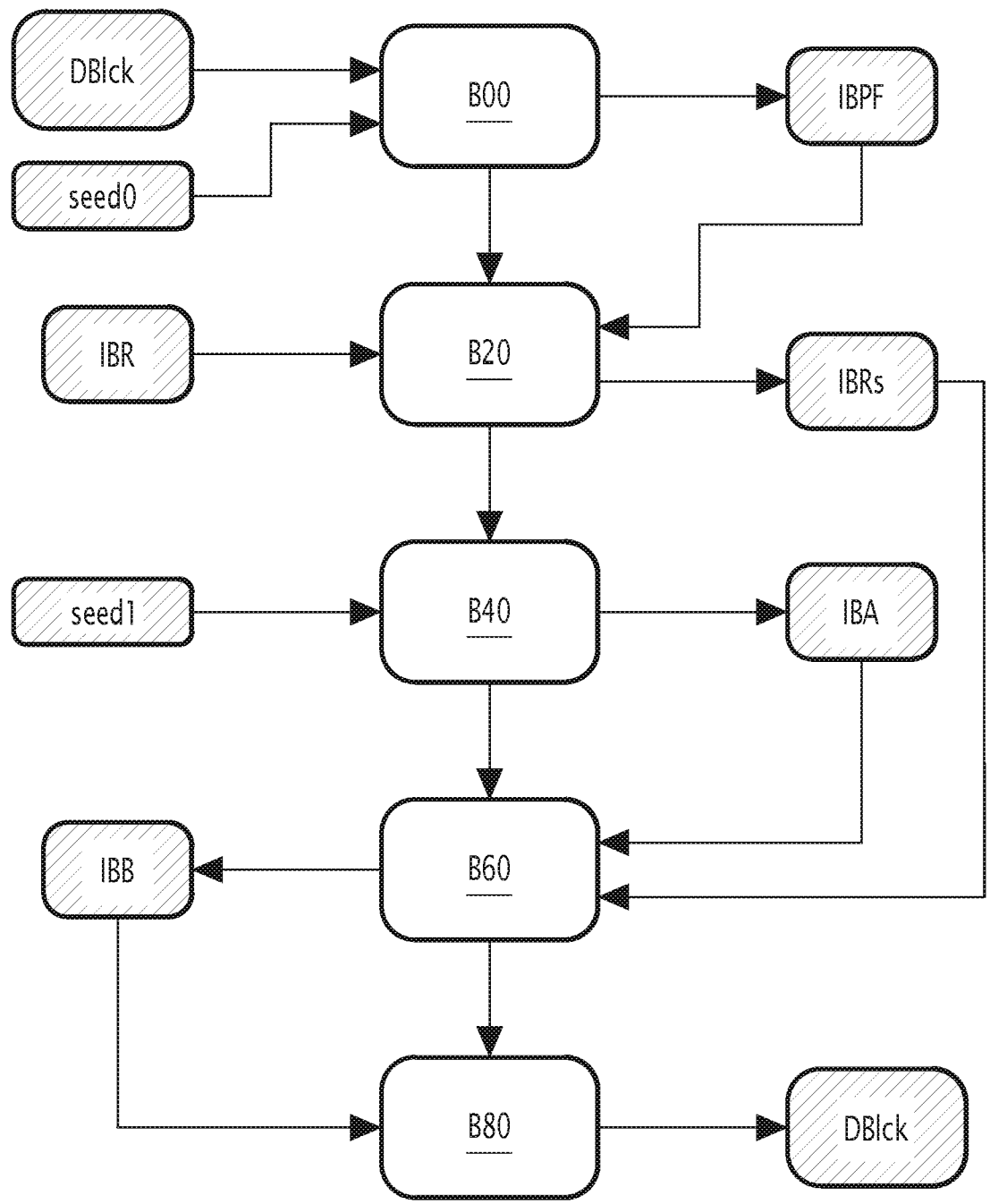
FIG. 4 illustrates a second example of the digital watermarking of a neural network, in accordance with an embodiment of the present invention.

Referring to FIG. 4, this second example shows how the message to be tattooed is formed. The method used is as follows:

In current block DBlck, a predetermined number of most significant bits are obtained (B00) from a random selection of parameters. using a selection seed seed0 which is retained; the most significant bits selected are arranged so as to form an IBPF binary image of predetermined size (in length and width);

Depending on the desired size of the image, for each (randomly selected) parameter in the current block, one or more most significant bits may be selected; for example, four most significant bits, for example in indexes 26 to 23, may be selected for each parameter. This is a purely illustrative example.

The IBPF binary image is combined (B20) with an IBR reference binary image, which acts as a secret message; the sizes of the IBPF and IBR binary images are identical; this combination delivers a signed reference binary image IBRs; it is signed by the most significant bits selected in the block;

A random binary image IBA is generated (B40), for example using a generation seed seed1 which is kept for decoding;

Signed reference binary image IBRs is combined (B60) with random binary image IBA to form a noisy binary image. IBB; and Noisy binary image IBB is inserted (B80) into the least significant bits of the current block's parameters, in place of the existing bits. Depending on the size of the image, for each parameter in the current block, one or more least significant bits can be erased; for example, four least significant bits, e.g., at indexes 10 to 7, may be overwritten for each parameter in the random parameter selection at operation B00).

Thanks to this implementation, a signature has been watermarked within a part of the current block, in the form of a binary image. During the decoding operation, it is therefore possible to visually identify the presence of this watermarked binary image. For the purposes of this document, a binary image, whether reference, characteristic, signature, etc., is a two-color (e.g., black and white) raster image. For example, it is coded in binary form (in base 2), or in a more complex form with only two possible colors.

The decoding method used is as follows: For a current block of parameters in a neural network, which we suspect belongs to a right holder, we extract the least significant bits which have supposedly been watermarked during a procedure identical or similar to that described above, delivering a binary image of the least significant bits, IBbpf. The most significant bits of the same parameters are also extracted, producing a binary image of the least significant bits, IBbpFo. These extractions are made possible by using selection seed seed0 and the bit indices determined during encoding. and kept for subsequent decoding. These two binary images are combined to provide an intermediate binary image, IBI. Random binary image IBA, used during encoding, is generated, for example, using generation seed seed1, which has been saved for decoding. Intermediate binary image IBI is combined with random binary image IBA to form a binary image for interpretation IBIn.

The advantage of this technique is that the binary image to be interpreted, IBIn, is a more or less degraded version of the IBR reference binary image used during coding. Since the combination operations performed on the images are identical, it is easy to display the image resulting from these bit combination operations. The differences that appear between reference binary image IBR (non-degraded) and binary image to be interpreted IBIn, are the result of modifications that have been made to the parameter block by the malicious person: relearning, pruning, etc., which have led to more or less significant modifications to the low-order bits of the current block's parameters do not totally alter the image, which remains interpretable and viewable.

A majority error correction may also be performed on the blocks concerned, to recover a more readable version of the image, when several blocks are watermarked with the same image, for example. In this way, it is possible to detect the presence of the watermarked image in several blocks, even if the neural network parameters are modified.

Selecting the Optimum Insertion Configuration

A majority error correction may also be performed on the blocks concerned, to recover a more readable version of the image, when several blocks are watermarked with the same image, for example. In this way, it is possible to detect the presence of the watermarked image in several blocks, even if the neural network parameters are modified.

In a complementary embodiment, the digital watermarking process described above can be implemented in an optimized manner by selecting, in the parameter blocks, the bit index(es) in which the message is inserted as a function of a performance and/or robustness threshold of the neural network. More specifically, in this example, the original neural network, i.e., before insertion of the digital watermarking, constitutes the reference in terms of performance and/or robustness. The process of the invention is implemented iteratively on the reference neural network to deliver at least one modified network, i.e., a watermarked network. The performance and/or robustness of the modified network is assessed against the performance and/or robustness delivered by the reference network. When the performance and/or robustness of the modified network is below a reference threshold, the watermarking is not retained.

Differentiated Selection of Parameter Blocks

According to the invention, parameter blocks in which the message is inserted are selected according to particular selection criteria.

For example, when a parameter block is small, when the number of parameter values in the parameter block is less than a predetermined threshold, this parameter block is not watermarked. This exclusion prevents parameter blocks from undergoing partial watermarking that cannot be read later.

Alternatively, or additionally, when a parameter block is reduced in size, the message to be inserted in this parameter block may be different. In this case, for example, a specific (reduced) message for reduced parameter blocks may be constructed to allow the insertion of a watermark. This method may be used, for example, when the number of numerical values in a parameter block is less than the length, in bits, of the "regular" message. For example, if the regular message is one hundred and twenty-eight bits long and the parameter block contains one hundred values, a reduced message with a length of sixty-four bits may be used to watermark this block.

In another aspect, when a block of parameters includes a majority of identical values, for example, only or mostly zeros or ones, the block of parameters may be excluded from the watermarking. This exclusion prevents an attacker from learning about the inserted watermark or part of the watermark. As explained above, one advantage of the invention is that the watermarking may be kept "secret", as it has little or no effect on the performance and/or robustness of the network. Excluding blocks containing mostly identical values prevents the attacker from learning about the watermarking from an assumption relating to these values (prior knowledge of these values by the attacker).

Additional Marking of Document Fields

According to an additional feature, the tattooing process also includes a document field marking operation. Depending on the format used to save the neural network resulting from the training, documentary fields are present. For example, the onnx format contains document fields that may be marked. For example, the following fields may be modified with a secret character string:
  model.producer_name
  model. producer_version
  model.doc_string
  model.graph.doc_string This secret character string may be identical to the message inserted in the parameter blocks. Preferably, however, this string will be different so that the content of the message or messages inserted in the parameter blocks may be kept secret. The advantage of this additional marking is that it does not require any modification of the values written in the neural network. It therefore has no impact on the performance of the neural network. As with the message inserted in the block values, this marking may include a predetermined number of characters, from which an error-correcting code is calculated, the resulting code word being encrypted and encoded in base 64, for example.

Additional Features Relating to the Neural Network

The neural network has a succession of layers of neurons, each of which takes its inputs from the outputs of the preceding layer.

More specifically, each layer includes neurons taking their inputs from the outputs of the neurons in the previous layer, or from the input variables for the first layer.

Alternatively, more complex neural network structures may be envisaged with a layer that can be linked to a layer further away than the immediately preceding layer.

Each neuron is also associated with an operation, i.e., a type of processing, to be performed by the artificial neuron within the corresponding processing layer.

Each layer is linked to the other layers by a number of synapses. A synaptic weight is associated with each synapse, and each synapse forms a link between two neurons. It is often a real number, which takes on both positive and negative values. In some cases, the synaptic weight is a complex number.

Each neuron is adapted to perform a weighted sum of the value(s) received from the neurons of the preceding layer, each value then being multiplied by the respective synaptic weight of each synapse, or link, between the neuron and the neurons of the preceding layer, then to apply an activation function, typically a non-linear function, to the weighted sum, and outputting the value resulting from the application of the activation function to the neuron, in particular to the neurons of the next layer connected to it. The activation function introduces non-linearity into the processing carried out by each neuron. The sigmoid function, the hyperbolic tangent function and the Heaviside function are examples of activation functions.

As an optional addition, each neuron is also able to additionally apply a multiplying factor to the output of the activation function, and the value delivered to the output of the neuron is then the product of the bias value and the output value of the activation function.

A convolutional neural network is sometimes also referred to as a CNN for short.

In a convolutional neural network, each neuron has exactly the same connection pattern as its neighboring neurons from one and the same layer, but at different input positions. The connection pattern is called a convolution kernel.

A fully connected layer of neurons is one in which the neurons of the layer are each connected to all the neurons in the previous layer.

This type of layer is more commonly known as a "fully connected" layer, and is sometimes referred to as a "dense layer".

These types of neural network are encoded in generic formats such as onnx. The present disclosure applies to any current type of neural network topology supported by this generic format, for example "fully connected", CNN, but also RNN, "Attention layer", . . . which is representable by one or more blocks of parameters including values as set forth above.

The invention claimed is:

1. A method of digital watermarking of a neural network, which method is implemented by an electronic device, said neural network being stored within a data structure consisting of blocks of parameters, the data structure comprising a current block of parameters, the current block of parameters comprising at least N parameters representing real numbers, the at least N parameters being selected from a group consisting of: layer weights, biases, tensor values, normalization values, and convolution values, the method comprising:
  obtaining a message comprising N bits, the message taking the form of an encrypted character string constructed from a predetermined reference character string; and
  at least N iterations of parameter modification within the current block of parameters, comprising:
    obtaining a current parameter from the at least N parameters of the current parameter block of parameters; and
    updating the value of a predetermined index bit of the current parameter as a function of a bit of the message.

2. The method according to claim 1, wherein said updating comprises calculating an operation or exclusively between a bit of a random vector of size N and a corresponding bit of the message.

3. The method according to claim 1, wherein the message is in the form of an encrypted code word.

4. The method according to claim 1, wherein said obtaining the message comprises:
  obtaining a reference character string;
  calculating a cyclic redundancy check code as a function of the reference character string, the cyclic check code being concatenated with the reference character string to form a code word; and
  delivering an encrypted code word.

5. The method according to claim 1, wherein said obtaining the message further comprises at least one iteration of copying the encrypted code word within a character string in order to obtain the message of N bit length.

6. The method according to claim 1, wherein said obtaining the message comprises:
   randomly selecting, within the current block, of a predetermined number K of most significant bits within a predetermined number of parameters of the current block delivering a characteristic binary image;
   combining the characteristic binary image with a reference image, delivering a merged image; and
   delivering the message, comprising further combining the merged image with a binary image obtained on the basis of a random draw of K bits.

7. The method according to claim 6, wherein said combining and said further combining each implement an operation or exclusively.

8. An electronic device for a digital watermarking of a neural network, the neural network being recorded within a data structure comprising blocks of parameters, the data structure comprising a current block of parameters, the current block comprising at least N parameters representing real numbers, the at least N parameters being selected from a group consisting of: layer weights, biases, tensor values, normalization values, and convolution values, the device comprising:
   means for obtaining a message comprising N bits, the message taking the form of an encrypted character string constructed from a predetermined reference character string; and
   means for implementing at least N parameter modification iterations within the current block of parameters, comprising:
      obtaining a current parameter from the at least N parameters of the current block of parameters; and
      updating the value of a predetermined index bit of the current parameter as a function of a bit of the message.

9. A non-transitory computer-readable medium including a computer program comprising instructions which, when executed by a programmable electronic device, cause the device to perform the digital watermarking method according to claim 1.

10. A non-transitory computer-readable medium storing a neural network, recorded within a data structure comprising blocks of parameters, the neural network being watermarked by the digital watermarking method according to claim 1.

* * * * *